United States Patent [19]

Sato

[11] Patent Number: 5,764,376
[45] Date of Patent: Jun. 9, 1998

[54] FACSIMILE MACHINE CAPABLE OF PREVENTING ERRONEOUS INITIATION OF AN ATTEMPT TO RECEIVE OR TRANSMIT FAX DATA BY THE FACSIMILE MACHINE

[75] Inventor: Tatsuya Sato, Nagoya, Japan

[73] Assignee: Brother Kogyo Kabushiki Kaisha, Nagoya, Japan

[21] Appl. No.: 689,644

[22] Filed: Aug. 12, 1996

[30] Foreign Application Priority Data

Aug. 18, 1995 [JP] Japan .................... 7-210311

[51] Int. Cl.$^6$ ............................................. H04N 1/32
[52] U.S. Cl. .................. 358/442; 358/468; 358/434; 379/100; 379/97
[58] Field of Search ............................. 358/442, 434, 358/468, 436–440, 406, 411, 405; 379/100, 97, 93, 96, 98, 94

[56] References Cited

U.S. PATENT DOCUMENTS

| | | | |
|---|---|---|---|
| 5,280,519 | 1/1994 | Nakajima et al. | 379/100 |
| 5,428,673 | 6/1995 | Nakagawa et al. | 379/100 |
| 5,487,105 | 1/1996 | Sakai | 379/100 |
| 5,544,234 | 8/1996 | Terajima et al. | 379/100 |
| 5,563,932 | 10/1996 | Tachibana et al. | 379/100 |

*Primary Examiner*—Edward L. Coles
*Assistant Examiner*—Cheukfan Lee
*Attorney, Agent, or Firm*—Oliff & Berridge, PLC

[57] ABSTRACT

A facsimile machine includes a line connector, a modem, a telephone connector and a switch. The switch of the facsimile machine is responsive to the receipt of a first number of facsimile operation request signals from the line connector to disconnect the telephone connector from the line connector and the modem. If a second set of facsimile operation request signals is received, the facsimile machine initiates operation of a receiver or transmitter. The facsimile machine prevents the receipt of recorded facsimile operation request signals via the telephone connector from initiating an attempt to receive or transmit facsimile data by the facsimile machine.

18 Claims, 2 Drawing Sheets

FACSIMILE MACHINE CAPABLE OF PREVENTING ERRONEOUS INITIATION OF AN ATTEMPT TO RECEIVE OR TRANSMIT FAX DATA BY THE FACSIMILE MACHINE

BACKGROUND OF THE INVENTION

1. Field of the Invention

The present invention relates to a facsimile machine having a telephone connector through which a telephone set is connectable to the facsimile machine.

2. Related Art Statement

There is known a facsimile machine having a telephone connector through which a telephone set is connectable to the facsimile machine. In the case where a telephone set having an answering function or device is connected to the facsimile machine via the telephone connector, the answering device starts to operate upon inputting of a calling signal via a telephone line. Then, if a facsimile-operation request signal (hereinafter, referred to as the "CNG" signal) is input to the facsimile machine via the telephone line, a modem of the facsimile machine detects the CNG signal and at the same time a recording device of the telephone set records the CNG signal.

FIG. 1 shows an electric circuit of an essential portion of a facsimile machine ("FAX") 1 to which the present invention is applied. The hardware construction of the essential portion of the FAX 1, shown in FIG. 1, is known in the art. The FAX 1 includes a central processing unit (CPU) 2, a modem 3 (i.e., modulator-demodulator), a line transformer (i.e., low-impedance transformer) 4, a high-impedance transformer 5, a first switch 6, a second switch 7, a bus line 8, a line connector 9, and a telephone ("TEL") connector 10. A telephone line 11 is connected to the line connector 9, and a telephone set ("TEL") 12 having an answering function or device is connected to the TEL connector 10.

The line connector 9 is connected to a common terminal 6a of the first switch, and the TEL connector 10 is connected to each of a first switchable terminal 6b of the first switch 6 and one end of the high-impedance transformer 5. A second switchable terminal 6c of the first switch 6 is connected to one end of the line transformer 4, and the other end of the high-impedance transformer 5 is connected is to a first switchable terminal 7b of the second switch 7. The other end of the line transformer 4 is connected to a second switchable terminal 7c of the second switch 7. A common terminal 7a of the second switch 7 is connected to one input/output end of the modem 3, and the CPU 2 is connected via an interface (not shown) to each of respective control terminals of the first and second switches 6, 7. The CPU 2 is connected via the bus line 8 to the modem 3, a random access memory (RAM, not shown), a read only memory (ROM, not shown), a facsimile-data receiver circuit (not shown), and a facsimile-data transmitter circuit (not shown), all of which are employed by the FAX 1.

Hereinafter, there will be described the conventional manner of operation of the first and second switches 6, 7. When the FAX 1 is in an answering-function mode in which the answering device of the TEL 12 is permitted to operate and the FAX 1 is waiting for a calling signal to be supplied from an exchanger via the telephone line 11, the first and second switches 6, 7 are in a first state, shown in FIG. 1, in which the respective common terminals 6a, 7a of the two switches 6, 7 are connected to the respective first switchable terminals 6b, 7b of the same 6, 7, respectively. If a calling signal is supplied via the telephone line 11, the calling signal is input to the TEL 12 via the line connector 9, the first switch 6, and the TEL connector 10, so that the answering device of the TEL 12 starts to operate, i.e., the recording device (e.g., cassette tape recorder) of the TEL 12 starts to record sounds on a recording medium (e.g., magnetic tape accommodated in a cassette). In the case where a distant calling device or station which is calling the FAX 1 is a facsimile machine, CNG signals are supplied to the FAX 1 via the telephone line 11. Thus, the CNG signals are detected by the modem 3 via the line connector 9, the first switch 6, the high-impedance transformer 5, and the second switch 7, and at the same time the CNG signals are input to the TEL 12 via the line connector 9, the first switch 6, and the TEL connector 10, so that the recording device of the TEL 12 records the CNG signals.

When a user of the FAX 1 hears the sounds or messages recorded by the recording device of the TEL 12, by using a distant telephone set and calling the FAX 1 via the telephone line 11, the CNG signals recorded on the magnetic tape are reproduced by a reproducing device of the TEL 12 and output to the telephone line 11 via the TEL connector 10, the first switch 6, and the line connector 9 and at the same time the CNG signals are input to the modem 3 via the TEL connector 10, the high-impedance transformer 5, and the second switch 7. Thus, the modem 3 detects the CNG signals and accordingly the facsimile-data receiver and/or transmitter of the FAX 1 erroneously start or starts to operate.

SUMMARY OF THE INVENTION

It is therefore a first object of the present invention to provide a facsimile machine which does not erroneously start when CNG signals are input thereto from a telephone set which has an answering function or device and which is connected thereto.

It is a second object of the present invention to provide a communication system which includes a facsimile machine and a telephone set connected to the facsimile machine, wherein the facsimile machine does not erroneously start when CNG signals are input thereto from the telephone set which has an answering function or device.

It is a third object of the present invention to provide a medium including a memory for storing a control program which is used by a computer of a facsimile machine so that the facsimile machine does not erroneously start when CNG signals are input thereto from a telephone set which has an answering function or device.

The first object may be achieved according to a first aspect of the present invention, which provides a facsimile machine comprising a line connector adapted to be connected to a communication line, a modem, a telephone connector adapted to be connected to a telephone set, a switching device which selectively switches to one of a first state in which the switching device connects the line connector, the modem, and the telephone connector to one another, and a second state in which the switching device connects the line connector and the modem to each other and disconnects the telephone connector from the line connector and the modem, at least one of a facsimile-data receiver which receives first facsimile data from the communication line via the line connector and the modem and a facsimile-data transmitter which outputs second facsimile data to the communication line via the modem and the line connector, and a control device which controls the switching device to switch from the first state to the second state when the control device receives, from the communication line via the line connector and the modem, a calling signal which calls the facsimile machine, and subsequently receives a first number of facsimile-operation request signals which request an operation of the one of the facsimile-data receiver and the facsimile-data transmitter, the control device controlling the one of the facsimile-data receiver and the facsimile-data transmitter to start the operation thereof, when the control device receives a second number of the facsimile-operation request signals after the switching device switches from the first state to the second state. The telephone set may be an external telephone set which is connectable to the telephone connector. The facsimile-data transmitter may comprise means for providing a polling function of the facsimile machine. The first or second number of facsimile-operation request signals may be one or a greater number. Each of the first and second numbers may be one.

In the facsimile machine in accordance with the first aspect of the invention, the facsimile-data receiver or transmitter does not start an operation thereof when a facsimile-operation request signal is supplied to the facsimile machine from the telephone set. Thus, the present facsimile machine enjoys a better performance.

According to a preferred feature of the first aspect of the invention, at least the first number is one. The second number may be one or a greater number. Even in the case where the telephone set has a recording device and a reproducing device, the recording device records only the one request signal and the reproducing device reproduces only the one request signal recorded by the recording device.

According to another feature of the first aspect of the invention, the second number is greater than one. The greater the second number is, the higher the reliability of operation of the facsimile-data receiver and/or transmitter is.

According to another feature of the first aspect of the invention, the control device comprises first means for controlling the one of the facsimile-data receiver and the facsimile-data transmitter to start the operation thereof, when the control device receives the second number of facsimile-operation request signals in a reference time period after the switching device switches from the first state to the second state.

According to another feature of the first aspect of the invention, the control device comprises second means for controlling the switching device to switch from the second state to the first state when the control device does not receive the second number of facsimile-operation request signals in the reference time period after the switching device switches from the first state to the second state.

According to another feature of the first aspect of the invention, the one of the facsimile-data receiver and the facsimile-data transmitter comprises the facsimile-data receiver, and wherein the control device controls the facsimile-data receiver to start the operation of receiving the first facsimile data, when the control device receives the second number of facsimile-operation request signals.

According to another feature of the first aspect of the invention, the switching device comprises a high-impedance transformer, and a low-impedance transformer having an impedance lower than an impedance of the high-impedance transformer, and wherein in the first state the switching device connects between the line connector and the modem via the high-impedance transformer and in the second state the switching device connects between the line connector and the modem via the low-impedance transformer. The high-impedance transformer effectively prevents the interaction between the modem and the telephone set when the telephone set is used.

According to another feature of the first aspect of the invention, the switching device comprises a first switch selectively switches to one of a first position where the first switch connects between the line connector and each of the telephone connector and the high-impedance transformer and a second position where the first switch connects between the line connector and the low-impedance transformer, and a second switch which selectively switches to one of a third position where the second switch connects between the high-impedance transformer and the modem and a fourth position where the second switch connects between the low-impedance transformer and the modem. When the switching device is in the second state, the switching device disconnects, with reliability, the telephone set from the modem of the facsimile machine.

The first object may also be achieved according to a second aspect of the present: invention, which provides a facsimile machine comprising a line connector adapted to be connected to a communication line, a modem, a telephone connector adapted to be connected to a telephone set, a switching device which selectively switches to one of a first state in which the switching device connects the line connector, the modem, and the telephone connector to one another, and a second state in which the switching device connects the line connector and the modem to each other and disconnects the telephone connector from the line connector and the modem, at least one of a facsimile-data receiver which receives first facsimile data from the communication line via the line connector and the modem and a facsimile-data transmitter which outputs second facsimile data to the communication line via the modem and the line connector, and a control device which controls the switching device to switch from the first state to the second state when the control device receives, from the communication line via the line connector and the modem, a calling signal which calls the facsimile machine, and subsequently receives a single facsimile-operation request signal which requests an operation of the one of the facsimile-data receiver and the facsimile-data transmitter.

In the facsimile machine in accordance with the second aspect of the invention, the switching device is switched from the first state to the second state when a single request signal is received after the reception of a calling signal. Thus, the following request signals are sent via a different route and are not supplied to the telephone set. Thus, the telephone set cannot record the following request signals. However, the control device receives those signals via the different route and can operate the facsimile-data receiver and/or transmitter.

According to a preferred feature of the second aspect of the invention, the control device comprises means for controlling the one of the facsimile-data receiver and the facsimile-data transmitter to start the operation thereof, when the control device receives at least one facsimile-operation request signal after the switching device switches from the first state to the second state.

The second object may be achieved according to a third aspect of the present invention, which provides a communication system comprising a facsimile machine, and a telephone set which is connected to the facsimile machine, the facsimile machine comprising a line connector adapted to be connected to a communication line, a modem, a switching device which selectively switches to one of a first state in which the switching device connects the line connector, the modem, and the telephone connector to one another, and a second state in which the switching device connects the line connector and the modem to each other and disconnects the telephone connector from the line connector and the modem, at least one of a facsimile-data receiver which receives first facsimile data from the communication line via the line connector and the modem and a facsimile-data transmitter which outputs second facsimile data to the communication line via the modem and the line connector, and a control device which controls the switching device to switch from the first state to the second state when the control device receives, from the communication line via the line connector and the modem, a calling signal which calls the facsimile machine, and subsequently receives a first number of facsimile-operation request signals which request an operation of the one of the facsimile-data receiver and the facsimile-data transmitter, the control device controlling the one of the facsimile-data receiver and the facsimile-data transmitter to start the operation thereof, when the control device receives a second number of the facsimile-operation request signals after the switching device switches from the first state to the second state, the telephone set comprising a recording device which records the first number of facsimile-operation request signals supplied to the telephone set from the communication line via the line connector before the switching device switches from the first state to the second state and which cannot record the second number of facsimile-operation request signals supplied to the facsimile machine after the switching device switches from -the first state to the second state.

The communication system in accordance with the third aspect of the invention enjoys the same advantages as those of the facsimile machine in accordance with the first aspect of the invention.

According to a preferred feature of the third aspect of the invention, the telephone set further comprises a reproducing device which reproduces the first number of facsimile-operation request signals recorded by the recording devices, when the telephone set receives, from the communication line via the line connector, a data-reproduction request signal which requests the telephone set to reproduce sound data which have been recorded by the recording device.

According to another feature of the third aspect of the invention, the facsimile machine further comprises a telephone connector which is connectable to the telephone set.

The third object may be achieved according to a fourth aspect of the present invention, which provides a medium including a memory for storing a control program which is used by a computer to control a facsimile machine, the memory being accessible by the computer to use the control program, the facsimile machine including a modem, a line connector adapted to be connected to a communication line, a telephone connector adapted to be connected to a telephone set, at least one of a facsimile-data receiver which receives first facsimile data from the communication line via the line connector and the modem and a facsimile-data transmitter which outputs second facsimile data to the communication line via the modem and the line connector, and a switching device which selectively switches to one of the first state in which the switching device connects the line connector, the modem, and the telephone connector to one another and the second state in which the switching device connects the line connector and the modem to each other and disconnects the telephone connector from the line connector and the modem, the control program comprising the steps of controlling the switching device to switch from the first state to the second state when the computer receives, from the communication line via the line connector and the modem, a calling signal which calls the facsimile machine, and subsequently receives a first number of facsimile-operation request signals which request an operation of the one of the facsimile-data receiver and the facsimile-data transmitter, and controlling the one of the facsimile-data receiver and the facsimile-data transmitter to start the operation thereof, when the computer receives a second number of the facsimile-operation request signals after the switching device switches from the first state to the second state.

The medium in accordance with the fourth aspect of the invention may directly be used as a part of the computer of the facsimile machine, or the control program stored by the medium may be read by the computer and recorded in a memory of the computer. According to the control program, the computer controls the facsimile machine to carry out an advantageous operation or operations. The facsimile machine may have a conventional hardware construction.

According to a preferred feature of the fourth aspect of the invention, at least the first number is one.

According to another feature of the fourth aspect of the invention, the second number is greater than one.

According to another feature of the fourth aspect of the invention, the step of controlling the one of the facsimile-data receiver and the facsimile-data transmitter comprises controlling the one of the facsimile-data receiver and the facsimile-data transmitter to start the operation thereof, when the computer receives the second number of facsimile-operation request signals in a predetermined time period after the switching device switches from the first state to the second state.

According to another feature of the fourth aspect of the invention, the step of controlling the switching device comprises controlling the switching device to switch from the second state to the first state when the computer does not receive the second number of facsimile-operation request signals in the predetermined time period after the switching device switches from the first state to the second state.

The third object may also be achieved according to a fifth aspect of the present invention, which provides a medium including a memory for storing a control program which is used by a computer to control a facsimile machine, the memory being accessible by the computer to use the control program, the facsimile machine including a modem, a line connector adapted to be connected to a communication line, a telephone connector adapted to be connected to a telephone set, at least one of a facsimile-data receiver which receives first facsimile data from the communication line via the line connector and the modem and a facsimile-data transmitter which outputs second facsimile data to the communication line via the modem and the line connector, and a switching device which selectively switches to one of the first state in which the switching device connects the line connector, the modem, and the telephone connector to one another and the second state in which the switching device connects the line connector and the modem to each other and disconnects the telephone connector from the line connector and the modem, the control program comprising the step of controlling the switching device to switch from the first state to the second state when the computer receives, from the communication line via the line connector and the modem, a calling signal which calls the facsimile machine, and subsequently receives a single facsimile-operation request signal which requests an operation of the one of the facsimile-data receiver and the facsimile-data transmitter.

The medium in accordance with the fifth aspect of the invention enjoys the same advantages as those of the medium in accordance with the fourth aspect of the invention.

According to a preferred feature of the fifth aspect of the invention, the control program further comprises a step of controlling the one of the facsimile-data receiver and the facsimile-data transmitter to start the operation thereof, when the computer receives another facsimile-operation request signal after the switching device switches from the first state to the second state.

BRIEF DESCRIPTION OF THE DRAWINGS

The above and optional objects, features, and advantages of the present invention will better be understood by reading the following detailed description of the preferred embodiments of the invention when considered in conjunction with the accompanying drawings, in which.

DETAILED DESCRIPTION OF THE PREFERRED EMBODIMENTS

Figure 1:
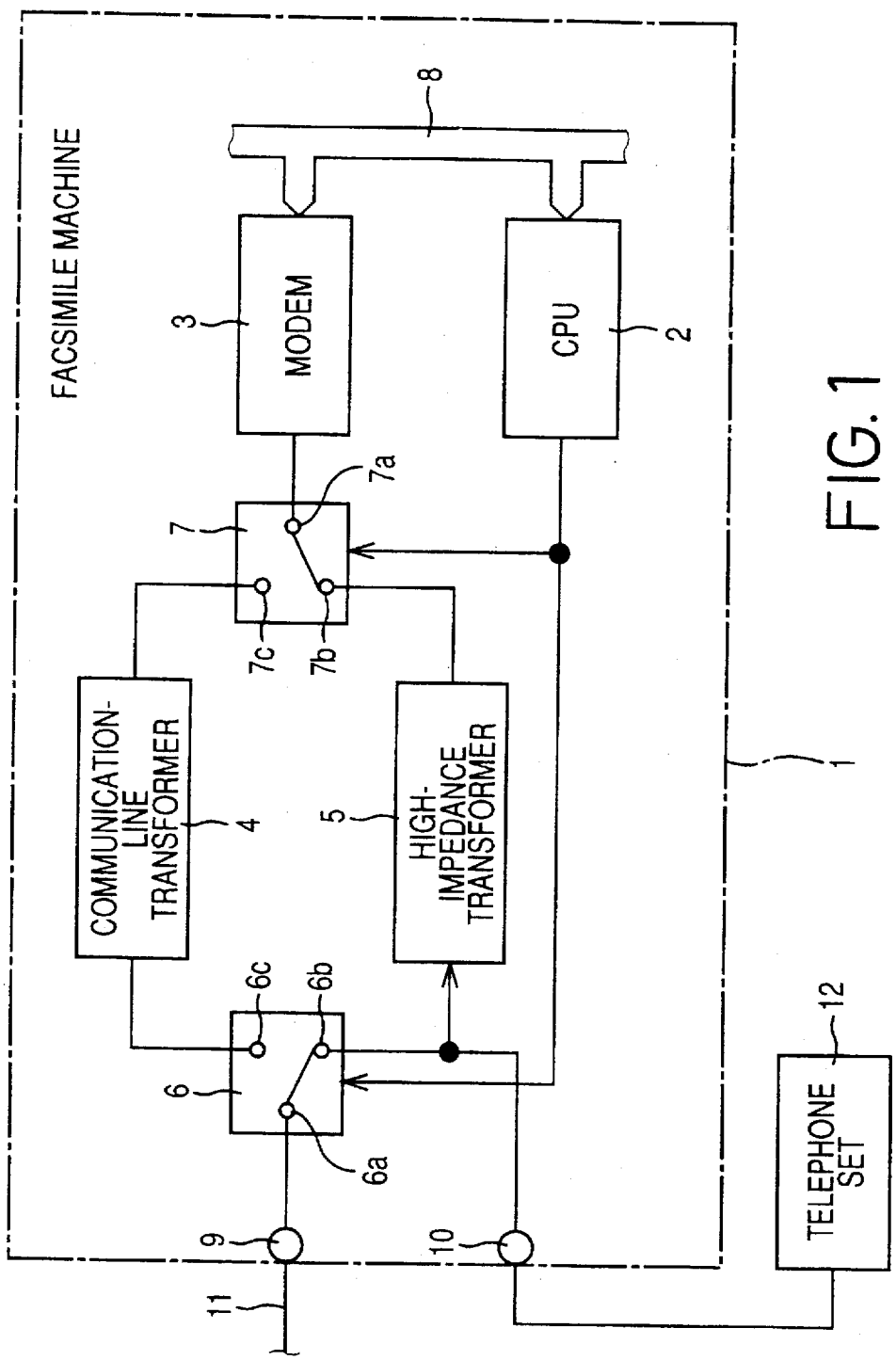
FIG. 1 is a diagrammatic view of an electric circuit of an essential part of a facsimile machine embodying the present invention.

FIG. 1 shows an essential portion of a facsimile machine ("FAX") 1 to which the present invention is applied. The hardware construction of the essential portion of the FAX 1 has been described previously, and repeated description thereof is omitted.

According to the principle of the present invention, the first and second switches 6, 7 of the FAX 1 operate in a different manner from the previously-described conventional manner. The two switches 6, 7 are controlled by the CPU 2, i.e., a computer including the CPU 2 and the ROM and the RAM (not shown), according to the control program which is pre-stored in the ROM and is represented by the flow chart of FIG. 2.

Hereinafter, the operation of the CPU 2 will be described by reference to FIG. 2. When the FAX 1 is in an answering-function mode in which the answering device of the TEL 12 is permitted to operate and the FAX 1 is waiting for a calling signal to be supplied from an exchanger via the telephone line 11, the first and second switches 6, 7 are placed, at Step S1 under control of the CPU 2, in a first state, shown in FIG. 1, in which the respective common terminals 6a, 7a of the two switches 6, 7 are connected to the respective first switchable terminals 6b, 7b of the same 6, 7, respectively. Step S1 is followed by Step S2 to judge whether the CPU 2 has received, from the exchanger via the telephone line 11, a calling signal to call the FAX 1. If a calling signal is supplied via the telephone line 11, the calling signal is input to the TEL 12 via the line connector 9, the first switch 6, and the TEL connector 10, so that the answering device of the TEL 12 starts to operate, i.e., the recording device of the TEL 12 starts to record sounds on a recording medium. At the same time, the calling signal is input to the modem 3 via the first switch 6, the high-impedance transformer 5, and the second switch 7. Based on a signal supplied from the modem 3 in response to the inputting of the calling signal, the CPU 2 detects the reception of the calling signal. Thus, a positive judgment is made at Step S2, and the control of the CPU 2 goes to Step S3.

At Step S3, the CPU 2 judges whether the CPU 2 has received a CNG signal. If a CNG signal is input to the line connector 9 via the telephone line 11, the CNG signal is input to the TEL 12 via the first switch 6 and the TEL connector 10, so that the answering device of the TEL 12 records the CNG signal. At the same time, the CNG signal is supplied to the modem 3 via the line connector 9, the first switch 6, the high-impedance transformer 5, and the second switch 7. Based on a signal supplied from the modem 3 in response to the inputting of the CNG signal, the CPU 2 detects the reception of the CNG signal. Thus, a positive judgment is made at Step S3, and the control of the CPU 2 goes to Step S4 to control the first and second switches 6, 7 to switch from the first state shown in FIG. 1, to a second state thereof in which the respective common terminals 6a, 7a of the two switches 6, 7 are connected to the respective second switchable terminals 6c, 7c of the same 6, 7, respectively. Step S4 is followed by Step S5 to start a timer which is provided by the CPU 2 of the computer.

Step S5 is followed by Step S6 to judge whether the CPU 2 has received another CNG signal. If another CNG signal is supplied to the FAX 1, then the second CNG signal is supplied to the modem 3 via the first switch 6, the line transformer 4, and the second switch 7. Based on a signal supplied from the modem 3 in response to the inputting of the CNG signal, the CPU 2 detects the reception of the CNG signal. Thus, a positive is made at Step S6, and the control of the CPU 2 goes to Step S7. On the other hand, since the TEL connector 10 is disconnected from the line connector 9 by the first switch 6, the second CNG signal is not supplied to the TEL 12 or recorded by the recording device thereof.

At Step S7, the CPU 2 controls the facsimile-data receiver circuit to start receiving the facsimile data supplied via the telephone line 11. The facsimile data are supplied to the modem 3 via the line connector 9, the first switch 6, the line-impedance transformer 4, and the second switch 7. Step S7 is followed by Step S8 to judge whether the receiver circuit has received all the facsimile data. If a positive judgment is made at Step S8, the CPU 2 controls the first and second switches 6, 7 to switch from the second state back to the first state, shown in FIG. 1, that is the same as established at Step S1, and the FAX 1 waits for receiving another calling signal. Thus, one control cycle according to the flow chart of FIG. 1 is ended.

If a negative judgment is made at Step S8, the CPU 2 repeats Step S8.

If a negative judgment is made at Step S6, the control of the CPU 2 goes to Step S10 to judge whether the timer has counted or measured a reference time period, e.g., 3 to 4 sec. A positive judgment made at Step S10 means that no facsimile data will be supplied the FAX 1. Then, the control of the CPU 2 goes to Step S9 to control the first and second switches 6, 7 to switch from the second state back to the first state. On the other hand, if a negative judgment is made at Step S10, the control goes back to Step S6 for waiting for the reception of the second CNG signal.

If a negative judgment is made at Step S3, the control of the CPU 2 goes to Step S11 to judge whether the current communication of the FAX 1 through the telephone line 11 has ended. This judgment may be made by detecting a direct current which flows between the telephone line 11 (i.e., distant station) and the TEL 12 while a communication is being carried out between the two elements 11, 12. The direct current may be detected by a photocoupler which connects the telephone line 11 and the CPU 2 in such a manner that the CPU 2 is electrically insulated from the TEL 12. If a positive judgment is made at Step S11, the current control cycle according to the flow chart of FIG. 2 is ended. On the other hand, if a negative judgment is made at Step S11, the control of the CPU 2 goes back to Step S3 to wait for receiving a CNG signal.

As is apparent from the foregoing description, in the present embodiment, the CPU 2 or the computer of the FAX 1 controls, when receiving the first CNG signal at Step S3, the first and second switches 6, 7 to switch from the first state shown in FIG. 1 to the second state in which the TEL 12 is disconnected from the modem 3, at Step S4. If another CNG signal is not received within the reference time period at Step S10, the CPU 2 controls, at Step S9, the first and second switches 6, 7 to switch from the second state back to the first state shown in FIG. 1 in which the TEL 12 is connected again to the modem 3 via the high-impedance transformer 5. Accordingly, the first CNG signal may be recorded by the recording device of the TEL 12 in the answering-function mode, and the recorded CNG signal may be reproduced by the reproducing device of the same TEL 12 in response to a data-reproduction request signal which may be supplied from a remote telephone set via the telephone line 11. However, no other CNG signal is recorded or reproduced because the two switches 6, 7 switch from the first state to the second state. In addition, the modem 3 may detect the first CNG signal reproduced by the TEL 12, but cannot detect any other CNG signal reproduced by the TEL 12, because the TEL 12 is disconnected from the modem 3. Thus, the CPU 2 does not erroneously control the facsimile-data receiver or transmitter to start receiving or transmitting facsimile data, in response to the CNG signal or signals reproduced by the TEL 12.

While the present invention has been described in its preferred embodiment, the present invention may otherwise be embodied.

For example, although in the illustrated embodiment the CPU 2 controls, at Step S4, the first and second switches 6, 7 to switch or change from the first state to the second state, when the CPU 2 detects, at Step S3, a single CNG signal after detecting a call signal at Step S2, it is possible to adapt the CPU 2 to control the two switches 6, 7 to switch to the second state, when the CPU 2 detects a predetermined first number of CNG signals after detecting a call signal at Step S2. The first number may be greater than one.

While in the illustrated embodiment the CPU 2 controls, at Step S7, the facsimile-data receiver to start receiving facsimile data, when the CPU 2 detects, at Step S6, a single CNG signal after the first and second switches 6, 7 has switched from the first state to the second state at Step S4, it is possible to adapt the CPU 2 to control the facsimile-data receiver to start receiving facsimile data, when the CPU 2 detects a predetermined second number of CNG signals after the first and second switches 6, 7 have switched from the first state to the second state at Step S4. The second number may be greater than one.

Figure 2:
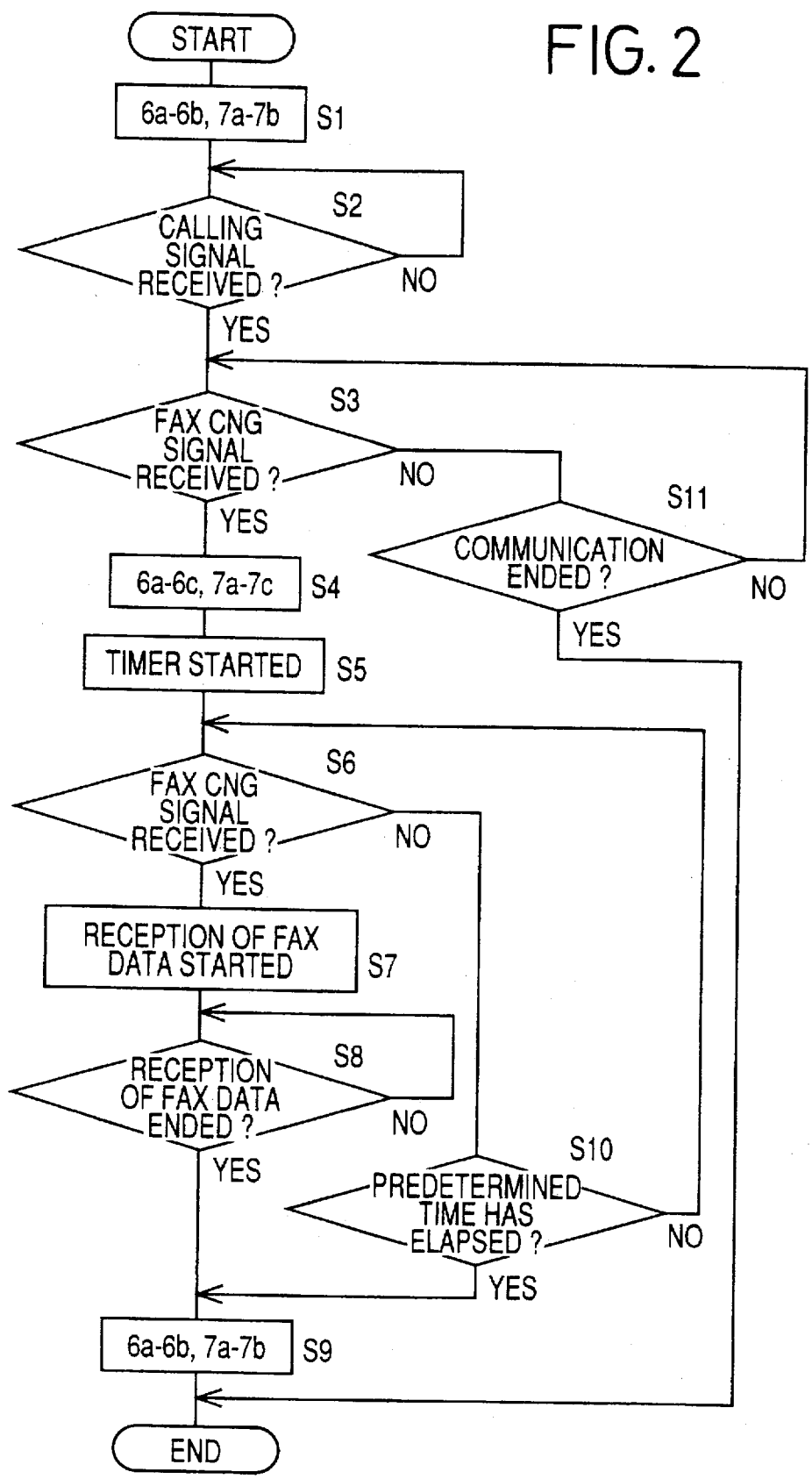
FIG. 2 is a flow chart representing a control program pre-stored in a read only memory (ROM) of a computer of the facsimile machine of FIG. 1.

While in the illustrated embodiment the control program represented by the flow chart of FIG. 2 is pre-stored in the ROM of the computer of the FAX 1, the control program may be recorded on a ROM card and the ROM card may be inserted in a reading device of the computer so that the control program is read by the reading device and stored in a memory of the computer.

It is to be understood that the present invention may be embodied with other changes, improvements, and modifications that may occur to those skilled in the art without departing from the spirit and scope of the invention defined in the appended claims.

What is claimed is:

1. A facsimile machine comprising:

a line connector adapted to be connected to a communication line;

a modem;

a telephone connector adapted to be connected to a telephone set;

a switching device which selectively switches to one of a first state in which said switching device connects said line connector, said modem, and said telephone connector to one another, and a second state in which the switching device connects the line connector and the modem to each other and disconnects the telephone connector from the line connector and the modem;

at least one of a facsimile-data receiver which receives first facsimile data from the communication line via said line connector and said modem and a facsimile-data transmitter which outputs second facsimile data to the communication line via the modem and the line connector; and a control device which controls said switching device to switch from said first state to said second state when said control device receives, from the communication line via said line connector and said modem, a calling signal which calls the facsimile machine, and subsequently receives a first number of facsimile-operation request signals which request an operation of said one of said facsimile-data receiver and said facsimile-data transmitter, said control device controlling said one of said facsimile-data receiver and said facsimile-data transmitter to start said operation thereof, when the control device receives a second number of said facsimile-operation request signals after said switching device switches from said first state to said second state.

2. A facsimile machine according to claim 1, wherein at least said first number is one.

3. A facsimile machine according to claim 1, wherein said second number is greater than one.

4. A facsimile machine according to claim 1, wherein said control device comprises first means for controlling said one of said facsimile-data receiver and said facsimile-data transmitter to start said operation thereof, when the control device receives said second number of facsimile-operation request signals in a reference time period after said switching device switches from said first state to said second state.

5. A facsimile machine according to claim 4, wherein said control device comprises second means for controlling said switching device to switch from said second state to said first state when the control device does not receive said second number of facsimile-operation request signals in said reference time period after the switching device switches from the first state to the second state.

6. A facsimile machine according to claim 1, wherein said one of said facsimile-data receiver and said facsimile-data transmitter comprises said facsimile-data receiver, and wherein said control device controls said facsimile-data receiver to start said operation of receiving said first facsimile data, when the control device receives said second number of facsimile-operation request signals.

7. A facsimile machine according to claim 1, wherein said switching device comprises a high-impedance transformer, and a low-impedance transformer having an impedance lower than an impedance of said high-impedance transformer, and wherein in said first state the switching device connects between said line connector and said modem via said high-impedance transformer and in said second state the switching device connects between the line connector and the modem via said low-impedance transformer.

8. A facsimile machine according to claim 7, wherein said switching device comprises a first switch selectively switches to one of a first position where said first switch connects between said line connector and each of said telephone connector and said high-impedance transformer and a second position where the first switch connects between the line connector and said low-impedance transformer, and a second switch which selectively switches to one of a third position where said second switch connects between said high-impedance transformer and said modem and a fourth position where the second switch connects between said low-impedance transformer and the modem.

9. A facsimile machine comprising:

a line connector adapted to be connected to a communication line;

a modem;

a telephone connector adapted to be connected to a telephone set;

a switching device which selectively switches to one of a first state in which said switching device connects said line connector, said modem, and said telephone connector to one another, and a second state in which the switching device connects the line connector and the modem to each other and disconnects the telephone connector from the line connector and the modem;

at least one of a facsimile-data receiver which receives first facsimile data from the communication line via said line connector and said modem and a facsimile-data transmitter which outputs second facsimile data to the communication line via the modem and the line connector; and a control device which controls said switching device to switch from said first state to said second state when said control device receives, from the communication line via said line connector and said modem, a calling signal which calls the facsimile machine, and subsequently receives a single facsimile-operation request signal which requests an operation of said one of said facsimile-data receiver and said facsimile-data transmitter, wherein said control device comprises means for controlling said one of said facsimile-data receiver and said facsimile-data transmitter to start said operation thereof, when the control device receives at least one facsimile-operation request signal after said switching device switches from said first state to said second state.

10. A communication system comprising:

a facsimile machine; and a telephone set which is connected to said facsimile machine, said facsimile machine comprising a line connector adapted to be connected to a communication line, a modem, a switching device which selectively switches to one of a first state in which said switching device connects said line connector, said modem, and said telephone connector to one another, and a second state in which the switching device connects the line connector and the modem to each other and disconnects the telephone connector from the line connector and the modem;

at least one of a facsimile-data receiver which receives first facsimile data from the communication line via said line connector and said modem and a facsimile-data transmitter which outputs second facsimile data to the communication line via the modem and the line connector, and a control device which controls said switching device to switch from said first state to said second state when said control device receives, from the communication line via said line connector and said modem, a calling signal which calls the facsimile machine, and subsequently receives a first number of facsimile-operation request signals which request an operation of said one of said facsimile-data receiver and said facsimile-data transmitter, said control device controlling said one of said facsimile-data receiver and said facsimile-data transmitter to start said operation thereof, when the control device receives a second number of said facsimile-operation request signals after said switching device switches from said first state to said second state, said telephone set comprising a recording device which records said first number of facsimile-operation request signals supplied to the telephone set from the communication line via said line connector before said switching device switches from said first state to said second state and which cannot record said second number of facsimile-operation request signals supplied to said facsimile machine after the switching device switches from the first state to the second state.

11. A communication system according to claim 10, wherein said telephone set further comprises a reproducing device which reproduces said first number of facsimile-operation request signals recorded by said recording device, when the telephone set receives, from the communication line via said line connector, a data-reproduction request signal which requests the telephone set to reproduce sound data which have been recorded by the recording device.

12. A communication system according to claim 10, wherein said facsimile machine further comprises a telephone connector which is connectable to said telephone set.

13. A medium including a memory for storing a control program which is used by a computer to control a facsimile machine, the memory being accessible by the computer to use the control program, the facsimile machine including a modem, a line connector adapted to be connected to a communication line, a telephone connector adapted to be connected to a telephone set, at least one of a facsimile-data receiver which receives first facsimile data from the communication line via the line connector and the modem and a facsimile-data transmitter which outputs second facsimile data to the communication line via the modem and the line connector, and a switching device which selectively switches to one of the first state in which the switching device connects the line connector, the modem, and the telephone connector to one another and the second state in which the switching device connects the line connector and the modem to each other and disconnects the telephone connector from the line connector and the modem, the control program comprising the steps of:

controlling the switching device to switch from the first state to the second state when the computer receives, from the communication line via the line connector and the modem, a calling signal which calls the facsimile machine, and subsequently receives a first number of facsimile-operation request signals which request an operation of said one of the facsimile-data receiver and the facsimile-data transmitter, and controlling said one of the facsimile-data receiver and the facsimile-data transmitter to start said operation thereof, when the computer receives a second number of said facsimile-operation request signals after the switching device switches from the first state to the second state.

14. A medium according to claim 13, wherein at least said first number is one.

15. A medium according to claim 13, wherein said second number is greater than one.

16. A medium according to claim 13, wherein the step of controlling said one of the facsimile-data receiver and the facsimile-data transmitter comprises controlling said one of the facsimile-data receiver and the facsimile-data transmitter to start said operation thereof, when the computer receives said second number of facsimile-operation request signals in a predetermined time period after the switching device switches from the first state to the second state.

17. A medium according to claim 16, wherein the step of controlling the switching device comprises controlling the switching device to switch from the second state to the first state when the computer does not receive said second number of facsimile-operation request signals in said predetermined time period after the switching device switches from the first state to the second state.

18. A medium including a memory for storing a control program which is used by a computer to control a facsimile machine, the memory being accessible by the computer to use the control program, the facsimile machine including a modem, a line connector adapted to be connected to a communication line, a telephone connector adapted to be connected to a telephone set, at least one of a facsimile-data receiver which receives first facsimile data from the communication line via the line connector and the modem and a facsimile-data transmitter which outputs second facsimile data to the communication line via the modem and the line connector, and a switching device which selectively switches to one of the first state in which the switching device connects the line connector, the modem, and the telephone connector to one another and the second state in which the switching device connects the line connector and the modem to each other and disconnects the telephone connector from the line connector and the modem, the control program comprising the steps of:

controlling the switching device to switch from the first state to the second state when the computer receives, from the communication line via the line connector and the modem, a calling signal which calls the facsimile machine, and subsequently receives a single facsimile-operation request signal which request an operation of said one of the facsimile-data receiver and the facsimile-data transmitter; and controlling said one of the facsimile-data receiver and the facsimile-data transmitter to start said operation thereof, when the computer receives another facsimile-operation request signal after the switching device switches from the first state to the second state.

* * * * *